United States Patent
Hida (10) Patent No.: US 10,022,868 B2
(45) Date of Patent: Jul. 17, 2018

(54) INVERSE KINEMATIC SOLUTION FOR MULTI-JOINT LINK MECHANISM, AND TEACHING-DATA CREATING DEVICE USING THE INVERSE KINEMATIC SOLUTION

(71) Applicant: Kobe Steel, Ltd., Hyogo (JP)

(72) Inventor: Masatoshi Hida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 266 days.

(21) Appl. No.: 14/889,303

(22) PCT Filed: May 29, 2014

(86) PCT No.: PCT/JP2014/064312
§ 371 (c)(1),
(2) Date: Nov. 5, 2015

(87) PCT Pub. No.: WO2014/192884
PCT Pub. Date: Dec. 4, 2014

(65) Prior Publication Data
US 2017/0057086 A1     Mar. 2, 2017

(30) Foreign Application Priority Data
May 29, 2013  (JP) .................. 2013-112973

(51) Int. Cl.
B25J 9/16      (2006.01)

(52) U.S. Cl.
CPC ... B25J 9/1664 (2013.01); *G05B 2219/41405* (2013.01)

(58) Field of Classification Search
CPC ................... B25J 9/1664; B25J 9/1682
(Continued)

(56) References Cited

U.S. PATENT DOCUMENTS 4,954,762 A * 9/1990 Miyake .............. G05B 19/4182
                                                    219/124.34
5,279,176 A * 1/1994 Tahmasebi ............... B25J 9/106
                                                       74/490.01
(Continued)

FOREIGN PATENT DOCUMENTS

CN      101811301 A    8/2010
JP      H05-266147 A   10/1993
(Continued)

OTHER PUBLICATIONS

International Search Report issued in PCT/JP2014/064312, dated Sep. 9, 2014.
(Continued)

*Primary Examiner* — Timothy R Waggoner
(74) *Attorney, Agent, or Firm* — Studebaker & Brackett PC (57) ABSTRACT

This multi-joint link mechanism has a driving joint driven by a driving source and a follower joint driven by the movement of the driving joint. First, an open-loop link mechanism that allows the position and pose of a workpiece to be varied is selected from a multi-joint link mechanism. The amount of movement/rotation of each of the joints constituting the selected open-loop link mechanism is derived. The derived amounts of movement/rotation of each of the joints of the open-loop link mechanism are set as fixed values to derive the amount of movement/rotation of each of the joints of a closed-loop link mechanism composed of non-selected joints and at least some of the joints of the open-loop link mechanism.

5 Claims, 9 Drawing Sheets

(58) Field of Classification Search
USPC .................................................. 700/245, 262
See application file for complete search history.

(56) References Cited

U.S. PATENT DOCUMENTS

| | | | |
|---|---|---|---|
| 5,353,386 A * | 10/1994 | Kasagami | B25J 9/1682 |
| | | | 700/247 |
| 5,831,875 A | 11/1998 | Hirata et al. | |
| 6,003,400 A | 12/1999 | Rauchfuss | |
| 6,047,610 A * | 4/2000 | Stocco | B25J 17/0266 |
| | | | 74/479.01 |
| 9,186,192 B2 * | 11/2015 | Biedermann | A61B 17/1671 |
| 9,248,573 B2 * | 2/2016 | Soe-Knudsen | B25J 9/1656 |

FOREIGN PATENT DOCUMENTS

| | | |
|---|---|---|
| JP | H07-155871 A | 6/1995 |
| JP | H10-083208 A | 3/1998 |
| JP | 2003-067427 A | 3/2003 |
| JP | 2010-231575 A | 10/2010 |
| JP | 2010-264515 A | 11/2010 |

OTHER PUBLICATIONS

Written Opinion issued in PCT/JP2014/064312, dated Sep. 9, 2014.
Nakamura, Y. et al. "A computational scheme of closed link robot dynamics derived by D'Alembert principle," Robotics and Automation, 1988. Proceedings., 1988 IEEE International Conference on, vol. 3, Apr. 29, 1988, pp. 1354-1360.

* cited by examiner

FIG. 9B

INVERSE KINEMATIC SOLUTION FOR MULTI-JOINT LINK MECHANISM, AND TEACHING-DATA CREATING DEVICE USING THE INVERSE KINEMATIC SOLUTION

TECHNICAL FIELD

The present invention relates to an inverse kinematic solution for a multi-joint link mechanism and to a teaching-data creating device that creates teaching data on the multi-joint link mechanism on the basis of the inverse kinematic solution.

BACKGROUND ART

An off-line teaching system has hitherto been used for teaching of a robot. The off-line teaching system moves and rotates three-dimensional graphic data input to a computer by giving the amounts of movement and amounts of rotation of joints to be driven to a mechanism of an articulated robot or a peripheral device such as a positioner or a traveling carriage, displays the graphic data on a display screen, and creates the working trajectory of the robot.

The articulated robot or the peripheral device, such as the positioner, is expressed by a link mechanism that defines the axial directions of joints (joint parts, axis parts) for rotating operation and translating operation and links between the joints.

In particular, for example, a multi-joint link mechanism of a positioner is constituted by driving joints to be driven by a motor. However, a certain type of multi-joint link mechanism includes not only the driving joints but also follower joints that move in operating association with the movements of the driving joints.

When calculating the motion of such a multi-joint link mechanism, it is preferable to give the amounts of movement/rotation of the driving joints necessary and sufficient to determine the motion of the multi-joint link mechanism and to derive the amounts of movement/rotation of the follower joints, for example, by calculation using a geometric analysis method or convergent calculation using the Jacobian matrix. By moving and rotating graphic data according to the derivation result, graphic display of teaching data can be achieved.

Since the above-described method determines the position and pose of the distal end of a device serving as an object by giving the amounts of movement/rotation of the driving joints, it corresponds to a forward transform (forward kinematics) in robotics in a broad sense. Such a calculation method is established as a conventional technique that automatically defines a loop mechanism (a closed polygon formed by connecting links) of a multi-joint link mechanism, for example, by mechanism analysis of CAD software, and calculates the behavior when a predetermined joint is operated (see, for example, NPL 1).

On the other hand, in an operation of creating off-line teaching data using the computer, for example, when a portion of a device including follower joints to be originally moved is a positioner for a workpiece, it is necessary to derive the values of amounts of movement/rotation of driving joints for moving the position and pose of the workpiece mounted in the device to a desired position and pose within the degree of freedom of the device. Since this is a problem reverse to the above-described forward transform that determines the position and pose of the distal end of the device by giving the amounts of movement/rotation of the driving joints, it is called an inverse transform (inverse kinematics) in robotics, and is a so-called inverse problem in the field of engineering.

When the multi-joint link mechanism of the device serving as the object always has a steady (fixed) structure, calculation for the inverse transform is not so difficult because it can use a geometric (analytical) solution.

However, the multi-joint link mechanism serving as the object has various structures. Even when the object is limited to a positioner, there are positioners having various structures (for example, FIGS. 2 and 8 of this embodiment). For this reason, the inverse transform using the geometric solution cannot be used for multi-joint link mechanisms having different structures, and it is necessary to prepare all geometric solutions to deal with all possible multi-joint link mechanisms beforehand.

Nonetheless, there are limitless combinations of multi-joint link mechanisms, and it is not realistic but is impossible to prepare all geometric solutions therefor beforehand. There is no geometric (analytical) solution that can deal with any multi-joint link mechanism regardless of definition. Hence, teaching data is created by a method in which the device is operated by a forward transform while moving the driving joints little by little and the position and pose of the object portion is adopted when it falls within the acceptable range for the desired position and pose. This method takes much calculation time or places burden on the operator.

For example, PTL 1 discloses a technique relating to a mechanism analysis modeling system that is considered to be usable for an inverse transform of a multi-joint link mechanism.

That is, PTL 1 discloses a mechanism analysis modeling system in a system that creates a link mechanism analysis model on the basis of the shapes of mechanism components displayed on a CAD drawing by using a CAD-drawing creating device. The mechanism analysis modeling system automatically transforms the input link mechanism analysis model into the link mechanism analysis model that is equivalent to the input link mechanism analysis model and is formed by a loop including independent variables in pose analysis of a mechanism system.

CITATION LIST

Patent Literature

PTL 1: Japanese Unexamined Patent Application Publication No. 5-266147

Non Patent Literature

NPL 1: Tsuneo Yoshikawa, Robot Seigyo Kisoron (CORONA PUBLISHING CO., LTD., 1988. 11)

SUMMARY OF INVENTION

Technical Problem

As described above, there are limitless combinations of multi-joint link mechanisms, and it is not realistic but is impossible to prepare all geometric solutions beforehand. Since there is no geometric (analytical) solution that can deal with any multi-joint link mechanism regardless of definition, teaching data has to be created by the method in which the mechanism analysis modeling system disclosed in PTL 1 is used, the device is operated by a forward transform while moving the driving joints little by little, and the position and pose of the object portion is adopted when it falls within the acceptable range for the desired position and pose. This method takes much calculation time or places burden on the operator. It is needless to say that such an inverse problem derivation method and such a determination method for teaching data are not realistic.

Accordingly, in view of the above-described demand, an object of the present invention is to provide an inverse kinematic solution for quickly calculating an amount of movement/rotation of a joint to be driven for a desired position and pose when an operator sets the position and pose of an object portion (workpiece) disposed at a distal end of a device within the degree of freedom of the device, and a teaching-data creating device using this inverse kinematic solution.

Solution to Problem

To achieve the above object, the present invention takes the following technical means.

An inverse kinematic solution for a multi-joint link mechanism according to the present invention is a method for determining, in a robot system including an articulated robot and a multi-joint link mechanism provided as a peripheral device of the robot, amounts of movement/rotation of joints in the multi-joint link mechanism to move an object disposed in the multi-joint link mechanism to a desired position and pose. The multi-joint link mechanism includes a driving joint driven by a driving source and a follower joint driven by movement of the driving joint. Amounts of movement/rotation of the driving joint and the follower joint are determined by performing the following steps (i) to (iii).

(i) An open-loop link mechanism formed by a minimum link structure for changing a position and pose of the object is selected from the multi-joint link mechanism.

(ii) Amounts of movement/rotation of joints that constitute the open-loop link mechanism selected in the step (i) are derived from the desired position and pose of the object placed in the multi-joint link mechanism.

(iii) The amounts of movement/rotation of the joints in the open-loop link mechanism derived in the step (ii) are set as fixed values to derive amounts of movement/rotation of joints in a closed-loop link mechanism constituted by at least one of the joints in the open-loop link mechanism and a non-selected joint.

Preferably, a link mechanism constituted by a link and a joint that start from the object and reach a fixed side of the link mechanism by a shortest distance is adopted as the open-loop link mechanism. Preferably, the multi-joint link mechanism is a positioner on which the object is placed and which can change the position and pose of the object.

A teaching-data creating device according to the present invention is a teaching-data creating device that determines, in a robot system including an articulated robot and a multi-joint link mechanism provided as a peripheral device of the robot, teaching data on the robot and the multi-joint link mechanism. The teaching-data creating device is configured to execute the above-described inverse kinematic solution for the multi-joint link mechanism.

Advantageous Effects of Invention

By using the inverse kinematic solution technique for the multi-joint link mechanism according to the present invention, the amounts of movement/rotation of the joints to be driven to the desired position and pose can be quickly calculated as long as the operator sets the position and pose of an object portion disposed at a distal end of the device within the degree of freedom of the device.

DESCRIPTION OF EMBODIMENTS

Embodiments of an inverse kinematic solution for a device including a multi-joint link mechanism according to the present invention and a teaching-data creating device that creates teaching data on the multi-joint link mechanism on the basis of the inverse kinematic solution will be described with reference to the drawings.

The outline of a robot system according to the present invention will be first described, and an inverse kinematic solution for a device including a multi-joint link mechanism according to the present invention will be next described. In the following description, the same components are denoted by the same reference numerals. The same components have the same names and the same functions. Therefore, detailed descriptions thereof are not repeated.

First Embodiment

Robot System

First, the overall configuration of a robot system according to this embodiment will be described.

Figure 1:
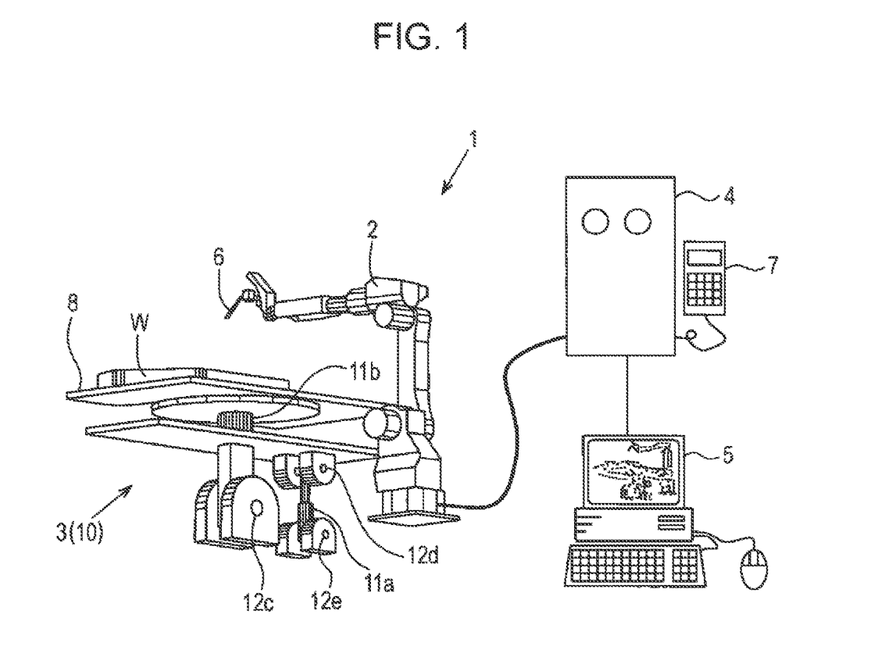
FIG. 1 is an overall configuration view of a robot system according to an embodiment of the present invention.

As illustrated in FIG. 1, a robot system 1 includes a welding robot 2, a positioner 3 that holds a workpiece W serving as a welding object (object) in a predetermined pose, a control device 4 that controls the welding robot 2 and the positioner 3, and an off-line teaching-data creating device 5 that creates teaching data on the welding robot 2 and the positioner 3 in an offline manner. The welding robot 2 gripe a welding torch 6 serving as a working tool. While the welding robot 2 is illustrated as an articulated robot that is common as an industrial robot, it may be robots of other types. The object held by the positioner 3 is not limited to the workpiece W.

A multi-joint link mechanism 10 to which the technique of the present invention is applied includes driving joints 11a and 11b to be driven by a driving source such as a motor, and follower joints 12c, 12d, and 12e that are moved by movement of the driving joints 11a and 11b. The multi-joint link mechanism 10 thus having the driving joints 11a and 11b and the follower joints 12c, 12d, and 12e is an object to which the present invention is applied. The term "joint" includes both an axis part and a joint part. In the description of the embodiment, the positioner 3 is given as an example of a device including such a multi-joint link mechanism 10. The multi-joint link mechanism 10 may be, for example, a slider (travelling carriage) that moves the welding robot 2 or the welding robot 2 itself.

The welding robot 2, the positioner 3, and the slider described above are controlled by the control device 4 equipped with a computer, and the control device 4 controls the welding robot 2 according to a program (teaching data) that teaches operations beforehand. The teaching data is created by using a teaching pendant 7 added to the control device 4, or is created beforehand by the off-line teaching-data creating device 5 using a personal computer. The program created by the off-line teaching-data creating device 5 is transferred to the control device 4 by utilizing a memory device and data communication.

The off-line teaching-data creating device 5 includes a graphic display serving as a display device, and includes a keyboard and a mouse serving as input devices. The off-line teaching-data creating device 5 further includes a storage device and a communication device as data input means for fetching CAD information about a workpiece W. The teaching program (created teaching data) is delivered to the control device 4 of the welding robot 2 by using these devices, as described above.

In the above-described off-line teaching-data creating device 5, an inverse kinematic solution for the multi-joint link mechanism 10 according to the present invention is executed, and as a result, off-line teaching data on the positioner 3 is calculated.

Hereinafter, a description will be given of a method for calculating off-line teaching data on the positioner 3 by using the inverse problem derivation method for the device including the multi-joint link mechanism 10.

[Descriptions of Joints and Links]

Figure 2:
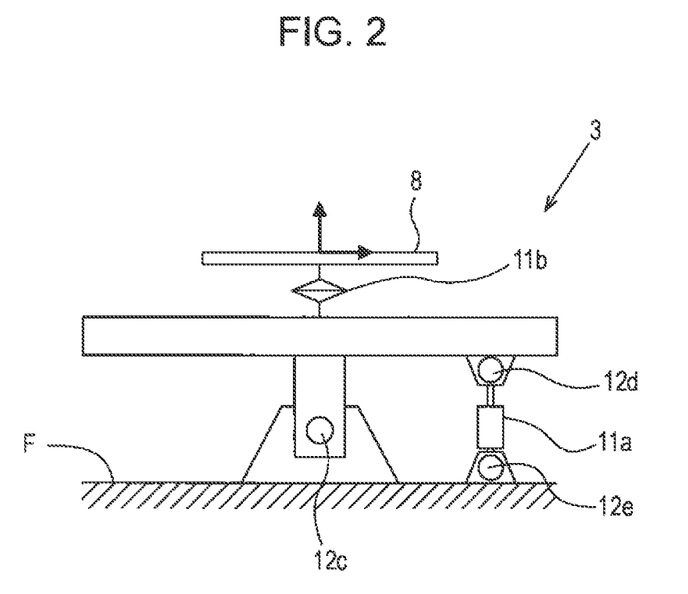
FIG. 2 is an explanatory view schematically illustrating a device having a multi-joint link mechanism (a first embodiment).
Figure 3:
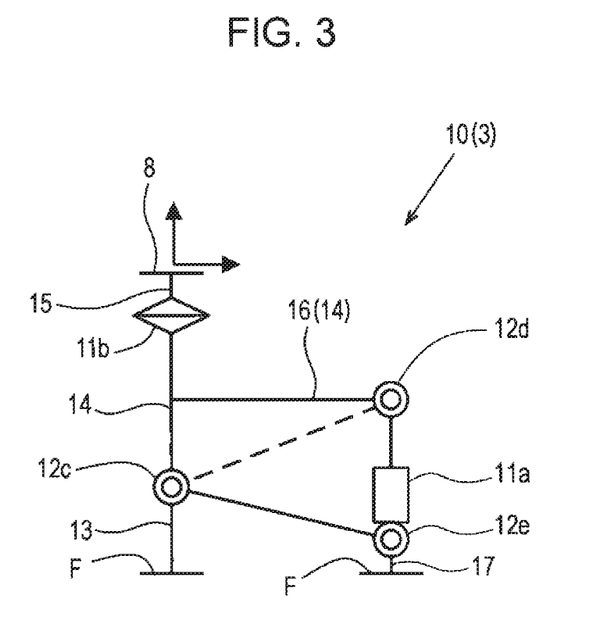
FIG. 3 is an explanatory skeleton diagram of the multi-joint link mechanism of FIG. 2.

First, FIG. 3 is a skeleton diagram of the positioner 3 (see FIG. 2) serving as an object. As is clear from this skeleton, a link mechanism that forms the positioner 3 serving as the object includes at least one follower joint 12c, 12d, or 12e.

Specifically, a first link 13 extends from a fixed side F (base side), and a second link 14 is provided ahead of the first link 13. The second link 14 is connected to the first link 13 via a rotation follower joint 12c rotatable on the horizontal axis. At a distal end of the second link 14, a rotation driving joint 11b that rotates coaxially with the axis of the second link 14 is provided, and a third link 15 is connected to the distal end of the second link 14 via the rotation driving joint 11b. A workpiece mounting base 8 on which the workpiece W is to be mounted is provided at the third link 15. A fourth link 16 horizontally projects from a middle portion of the second link 14. The fourth link 16 is provided integrally with the second link 14, and the fourth link 16 can be considered as a part of the second link 14.

On the other hand, at a position different from the first link 13, a fifth link 17 extends from the fixed side F (base side), and a distal end of the fifth link 17 is coupled to a distal end of the fourth link 16 by a translation driving joint 11a. As the translation driving joint 11a, an expandable and contractable member, such as a hydraulic cylinder, is adopted. Two ends of the translation driving joint 11a are coupled to the distal end of the fifth link 17 and the distal end of the fourth link 16 by rotation follower joints 12e and 12d, respectively.

Figure 4:
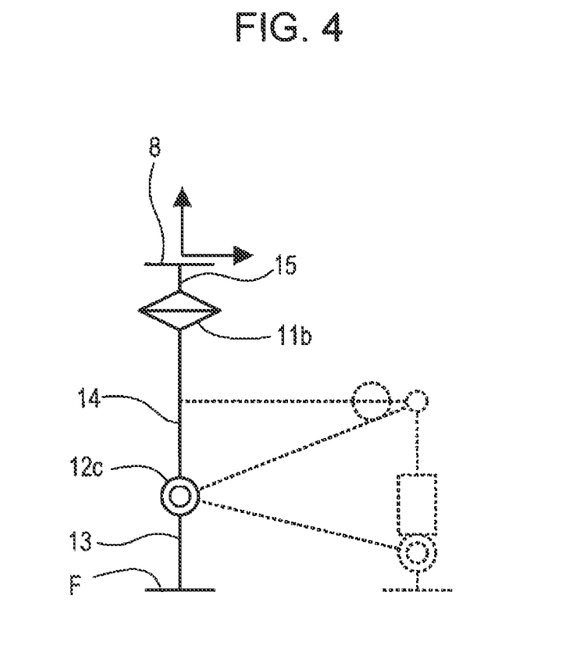
FIG. 4 is an explanatory view of an open-loop link provided in the multi-joint link mechanism of FIG. 2.
Figure 5:
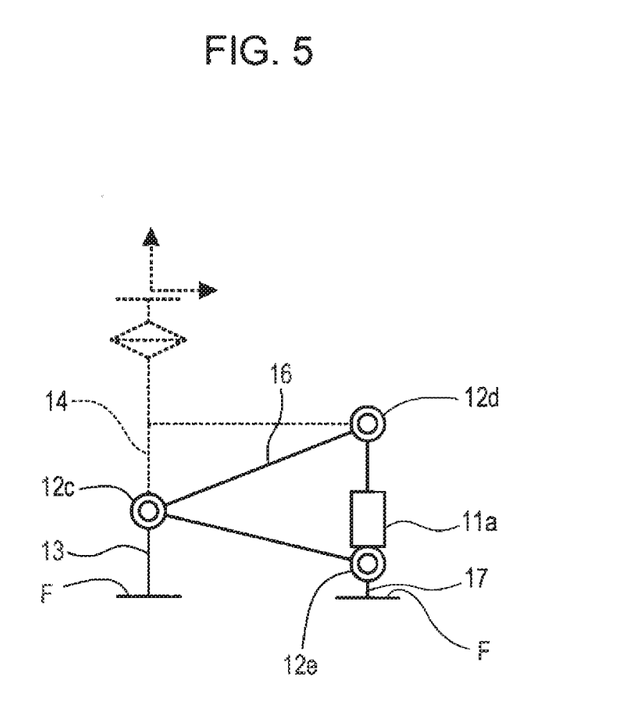
FIG. 5 is an explanatory view of a closed-loop link provided in the multi-joint link mechanism of FIG. 2.

The multi-joint link mechanism 10 of FIG. 3 can be considered separately into a link mechanism of an open-loop link illustrated in FIG. 4 and a link mechanism of a closed-loop link illustrated in FIG. 5.

That is, the open-loop link (open-loop link mechanism) is constituted by the first link 13 extending from the fixed side F (base side), the second link 14 coupled to the distal end of the first link 13 via the rotation follower joint 12c, the third link 15 coupled to the distal end of the second link 14 via the rotation driving joint 11b, and the workpiece mounting base 8. That is, the open-loop link refers to a link mechanism which is constituted by link members and joints and whose distal end is a free end.

The closed-loop link (closed-loop link mechanism) is constituted by the first link 13 extending from the fixed side F (base side), the fourth link 16 (including a base end of the second link 14) coupled to the distal end of the first link 13 via the rotation follower joint 12c, the fifth link 17, and the translation driving joint 11a coupled to the distal end of the fifth link 17 and the distal end of the fourth link 16 via the rotation follower joints 12d and 12e. That is, the closed-loop link refers to a link mechanism which is constituted by link members and joints, whose distal end is coupled to any of the joints that constitute the link mechanism, and which is shaped like a polygon.

[Description (Outline) of Inverse Problem (Inverse Kinematics)]

In an inverse transform of the multi-joint link mechanism 10 having such a structure, that is, a method for finding how much the translation driving joint 11a and the rotation driving joint 11b are to be driven and calculating the driving amounts as teaching data in order to determine a desired position and pose of the workpiece W (workpiece mounting base 8), the following process is performed.

That is, the amounts of movement/rotation of the driving joints 11a and 11b and the follower joints 12c, 12d, and 12e are determined to obtain teaching data by performing the following steps (i) to (iii).

(i) An open-loop link mechanism formed by the minimum link structure for changing the position and pose of the workpiece W is selected from the multi-joint link mechanism 10.

(ii) The amounts of movement/rotation of the joints that constitute the open-loop link mechanism selected in the step (i) are derived from a desired position and pose of the workpiece W placed on the multi-joint link mechanism 10.

(iii) The amounts of movement/rotation of joints in the open-loop link mechanism derived in the step (ii) are set as fixed values to drive the amounts of movement/rotation of joints in a closed-loop link mechanism constituted by at least one of the joints in the open-loop link mechanism and a non-selected joint.

Before performing the above process, the outline of determination of teaching data will be described first.

(STEP1) First, the values of the positioner 3 (joint values) of the positioner 3 are set so that the positioner 3 has a desired pose relative to a portion on the workpiece W to be welded.

(STEP2) The pose of the welding torch 6 (pose of the welding robot 2) relative to the welded portion on the workpiece W is set.

(STEP3) The slider position is set as necessary so that the welding robot 2 is within a working range and interference does not occur.

If interference occurs or the welding robot 2 moves out of the working range, the set values in STEP1 and STEP2 are changed, and the steps are repeated until adequate teaching data is calculated.

These operations are set to become a continuous operation in consideration of consecution of teaching points.

STEP 1 described above will be described in detail.

(STEP1-1) As a welded portion on the workpiece W, the welding position, the welding direction, and the welding reference direction orthogonal to the welding direction are designated, and the tilt angles in the right, left, upward, and downward directions are designated so that the welding pose becomes a predetermined welding pose.

(STEP1-2) In the off-line teaching-data creating device 5, a welding line coordinate system is created from the contents designated in (STEP1-1), and the pose the workpiece mounting base 8 of the positioner 3, on which the workpiece W is mounted, should take when the welding line coordinate system takes a desired pose is calculated.

(STEP1-3) In the off-line teaching-data creating device 5, the values of the joints in the positioner 3 are calculated from the pose of the workpiece mounting base 8 in the positioner 3.

(STEP1-4) In the off-line teaching-data creating device 5, the positioner 3 and the workpiece W attached to the positioner 3 are moved and displayed on the graphic screen according to the calculated values of the joints in the positioner 3.

[Description (Details) of Inverse Problem (Inverse Kinematics)]

In this embodiment, the technique of the present invention is carried out in (STEP1-3) described above. Details of the process in (STEP1-3) will be described below.

(STEP1-3-1) First, as the minimum link structure for moving the workpiece W, an open-loop link having the workpiece mounting base 8 of the positioner 3 at its distal end is selected. At this time, it is preferable to adopt, as the open-loop link, a link mechanism constituted by links and joints that start from the workpiece W and reach the fixed side F of the link mechanism by the shortest distance.

(STEP1-3-2) The amounts of movement/rotation of the joints (including both joint parts and axis parts) that constitute the open-loop link selected in (STEP1-3-1) described above are derived from the pose of the workpiece mounting base 8 of the positioner 3.

(STEP1-3-3) When the amounts of movement/rotation of the joints in the minimum link mechanism are determined, calculation used in mechanism analysis performed in, for example, CAD software usually used by those skilled in the art can be performed. Specifically, the amounts of movement/rotation of the joints derived in (STEP1-3-2) are set as fixed values, and calculation is conducted on a closed-loop link (a closed polygon formed by connecting links) including all of the remaining joints to derive the amounts of movement/rotation of all the remaining joints.

The steps (STEP1-3-1) to (STEP1-3-3) will be described on the basis of the positioner 3 illustrated in FIG. 2.

In the positioner 3 of FIG. 2, two joints, that is, the translation driving joint 11a and the rotation driving joint 11b can be driven. The positioner 3 further includes three joints, that is, the rotation follower joints 12c, 12d, and 12e as follower joints. By operating the two joints that can be driven, the pose of the workpiece W set at the distal end of the workpiece mounting base 8 can be changed within the range of two degrees of freedom. FIG. 3 is a skeleton diagram of the link mechanism in this device.

The positioner 3 aims to change the pose of the workpiece W set at the distal end of the workpiece mounting base 8, and the open-loop link (minimum link structure) that allows the change of pose can be expressed by a link mechanism constituted by two joints, that is, the rotation follower joint 12c and the rotation driving joint 11b, as illustrated in FIG. 4. The structure of the link mechanism whose distal end is at the workpiece mounting base 8 can be acquired at the time of calculation, for example, by being registered beforehand or by automatically extracting a combination having the minimum structure from combinations of the link mechanism from the device base to the workpiece mounting base 8 (STEP1-8-1).

As long as the acquired structure of the link mechanism and the pose of the workpiece mounting base 8 are given, the amounts of movement/rotation of the joints in this open-loop link can be derived by convergent calculation using the Jacobian matrix or the like. Since this method can be easily performed, for example, by applying the description in the robot-related academic book disclosed in NPL 1, details thereof are omitted. By this calculation, the amounts of movement/rotation of the two joints, that is, the rotation follower joint 12c and the rotation driving joint 11b can be derived (STEP1-3-2).

Figure 6:
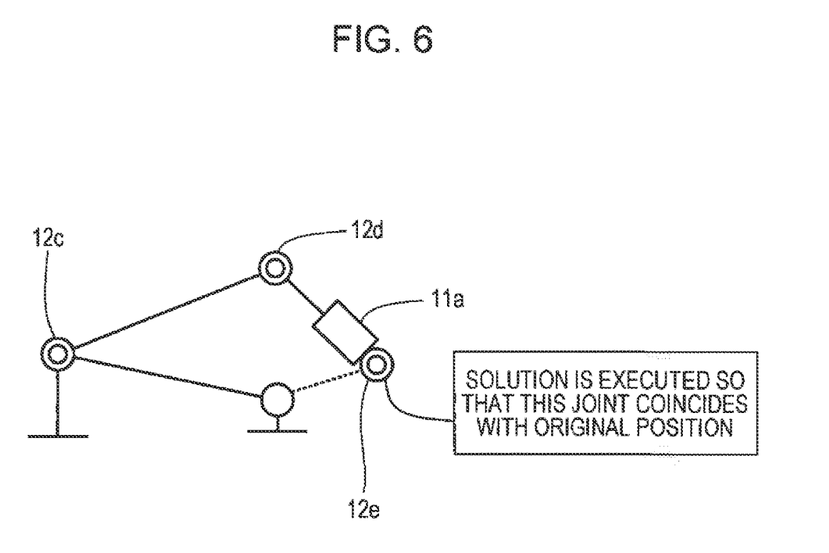
FIG. 6 is an explanatory view illustrating calculation of teaching data on the closed-loop link provided in the multi-joint link mechanism of FIG. 2.
Figure 7:
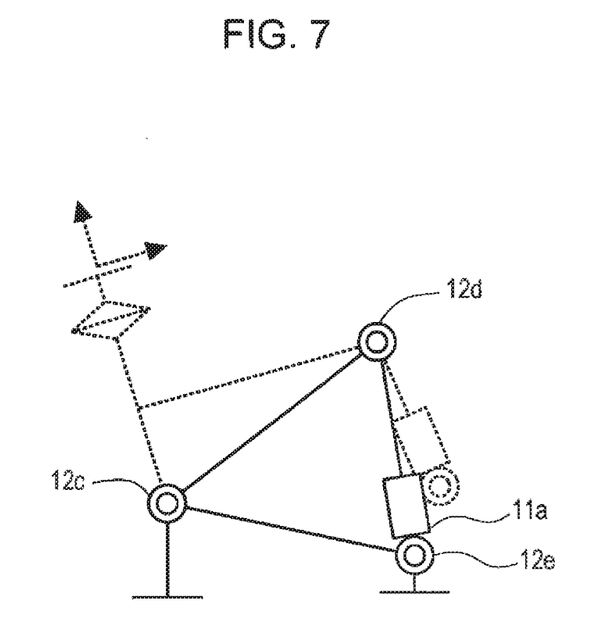
FIG. 7 is an explanatory view illustrating calculation of teaching data on the closed-loop link provided in the multi-joint link mechanism of FIG. 2.

FIG. 5 is a skeleton diagram of a closed-loop link in the positioner 3. The closed-loop link is formed by a closed triangle composed of four joints, that is, the translation driving joint 11a and the rotation follower joints 12c, 12d, and 12e. Since the amount of movement/rotation of the rotation follower joint 12c among these has been derived by the above-described method, it is only necessary to derive the amounts of movement/rotation of three remaining joints 11a, 12d, and 12e. While there are various solutions therefor, for example, the closed-loop link mechanism is considered as an unclosed link mechanism whose distal end is at the follower joint 12e, and the amounts of movement/rotation can be derived by performing convergent calculation using the Jacobian matrix so that the position of the rotation follower joint 12e coincides with its original position, as illustrated in FIG. 6. By giving the amount of rotation of the rotation follower joint 12c derived in STEP1-3-2 above, as illustrated in FIG. 7, the amounts of movement/rotation of the three remaining joints 11a, 12d, and 12e are found (STEP1-3-3).

Since the amounts of movement/rotation of all of the driving joints 11a and 11b and the follower joints 12c, 12d, and 12e are found by the above method, graphic display can be properly performed by moving and rotating the joints and the links added thereto.

As described above, when the operator sets the position and pose of the object portion disposed at the distal end of the device including the multi-joint link mechanism 10 of the present invention within the range of degrees of freedom of the device by using the inverse kinematic solution technique for the device, the amounts of movement/rotation of the joints to be driven for the desired position and pose can be quickly calculated.

Second Embodiment

Next, a description will be given of a second embodiment of an inverse kinematic solution for a device including a multi-joint link mechanism 10 according to the present invention.

While this embodiment determines teaching data on a positioner 3 (multi-joint link mechanism 10) on an idea similar to that of the first embodiment, the positioner 3 is greatly different in structure from the illustrated positioner 3 of the first embodiment. That is, the present invention is also applicable to a case in which the structure of the positioner 3 is greatly different. When the operator sets the position and pose of an object portion disposed at a distal end of the device within the range of degrees of freedom of the device, the amounts of movement/rotation of joints to be driven for the desired position and pose can be quickly calculated.

Figure 8:
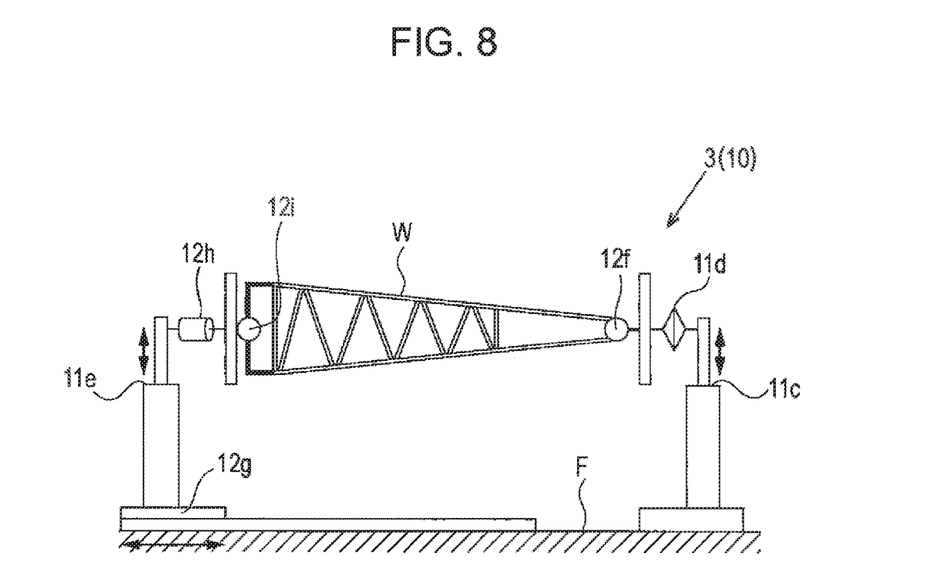
FIG. 8 is an explanatory view schematically illustrating a device having a multi-joint link mechanism (a second embodiment).
Figure 9A:
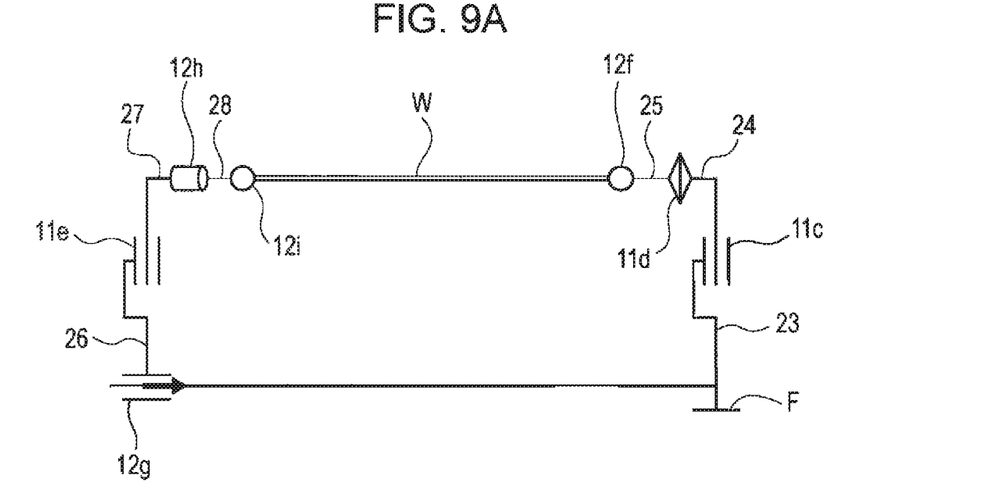
FIG. 9A is an explanatory skeleton diagram of the multi-joint link mechanism of FIG. 8.
Figure 9B:
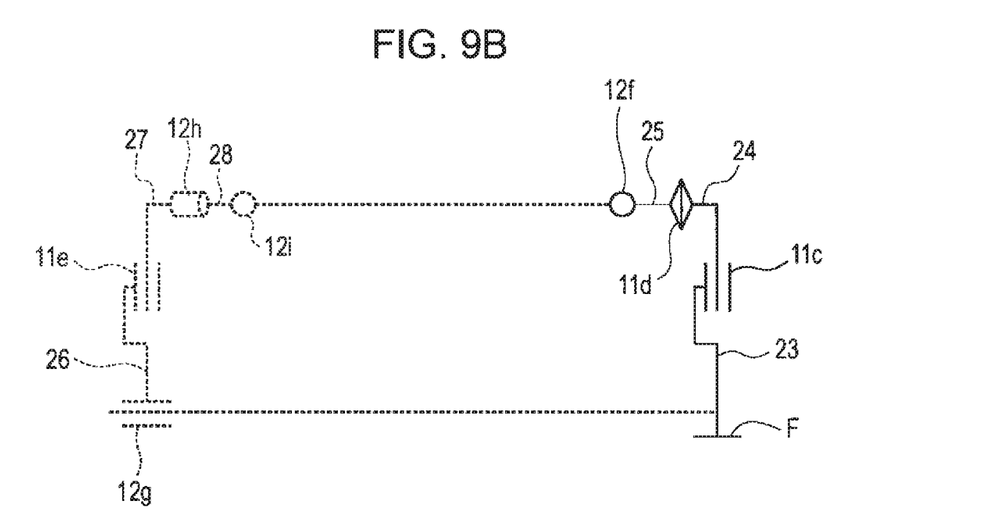
FIG. 9B is an explanatory view illustrating an open-loop link provided in the multi-joint link mechanism of FIG. 8.

FIG. 8 illustrates the positioner 3 according to the second embodiment. FIGS. 9A and 9B are skeleton diagrams of the positioner 3.

As illustrated in FIG. 9A, the positioner 3 includes a first link 23 extending from a fixed side F (base side), and a translation driving joint 11e is attached ahead of the first link 23. A second link 24 directed in the horizontal direction extends from an upper end of the translation driving joint 11c. When the translation driving joint 11c operates, the second link 24 expands and contracts up and down relative to the fixed side F. At a distal end of the second link 24, a rotation driving joint 11d is provided to rotate coaxially with the distal end of the second link 24, and a third link 25 is connected to the distal end of the second link 24 via the rotation driving joint 11d. To the third link 25, one side of a long workpiece W is attached via a rotation follower joint 12f that rotates on the horizontal axis.

On the other hand, the positioner 3 includes a fourth link 26 extending from the fixed side F (base side), and a base end of the fourth link 26 is freely movable on the fixed side F in the horizontal direction with a translation follower joint 12g being disposed therebetween. A translation driving joint 11e is attached ahead of the fourth link 26. A fifth link 27 directed in the horizontal direction extends from an upper end of the translation driving joint 11e. When the translation driving joint 11e operates, the fifth link 27 expands and contracts up and down relative to the fixed side F. At a distal end of the fifth link 27, a rotation follower joint 12h is provided to rotate coaxially with the axis of the distal end of the fifth link 27, and a sixth link 28 is connected via the rotation follower joint 12h. The other side of the long workpiece W is attached to the sixth link 28 via a rotation follower joint 12i that is rotatable on the horizontal axis.

The multi-joint link mechanism 10 of FIG. 9A can be considered separately into a link mechanism of an open-loop link shown by solid lines in FIG. 9B and a link mechanism of a closed-loop link shown by solid lines and broken lines in FIG. 9B.

That is, the open-loop link (first open-loop link) is constituted by the first link 23 extending from the fixed side F (base side), the translation driving joint 11c provided ahead of the first link 23, the second link 24 extending in the horizontal direction from the distal end of the translation driving joint 11c, the rotation driving joint 11d provided at the distal end of the second link 24, the third link 25 provided at the distal end of the second link 24 with the rotation driving joint 11d being disposed therebetween, and the rotation follower joint 12f provided at the distal end of the third link 25.

The closed-loop link is constituted by the above-described open-loop link (first open-loop link), the workpiece W attached at one end to the open-loop link, and an open-loop link (second open-loop link) to which the other side of the workpiece W is attached.

The open-loop link (second open-loop link) to which the other side of the workpiece W is attached is constituted by the fourth link 26 extending from the fixed side F (base side), the translation follower joint 12g that is freely movable in the horizontal direction on the base side of the fourth link 26, the translation driving joint 11e attached to the distal end of the fourth link 26, the fifth link 27 extending in the horizontal direction from the upper end of the translation driving joint 11e, the rotation follower joint 12h provided at the distal end of the fifth link 27, the sixth link 28 attached to the distal end of the fifth link 27 with the rotation follower joint 12h being disposed therebetween, and the rotation follower joint 12i attached to the distal end of the sixth link 28.

The technique of the present invention is also applicable to the above-described multi-joint link mechanism 10 constituted by the two open-loop links and the closed-loop link including the two open-loop links. That is, it is preferable to perform the following (STEP2-3-1) to (STEP2-3-3) in correspondence with (STEP1-3-1) to (STEP1-3-8) of the first embodiment.

(STEP2-3-1) An open-loop link having a workpiece mounting base 8 of the positioner 3 at its distal end is selected as the minimum link structure for moving the workpiece W. As this open-loop link, for example, the first open-loop link illustrated in FIG. 9B (the first link 23, the translation driving joint 11c, the second link 24, the rotation driving joint 11d, the third link 25, the rotation follower joint 12f) can be selected. The second open-loop link may be selected.

(STEP2-3-2) Next, the amounts of movement/rotation of the joints (including both joint parts and axis parts) that constitute the open-loop link selected in (STEP2-3-1) are derived from the pose of the workpiece mounting base 8 in the positioner 3.

(STEP2-3-3) When the amounts of movement/rotation of the joints in the minimum link mechanism are determined, it is possible to make calculation used in mechanism analysis performed in, for example, CAD software usually used by those skilled in the art. Specifically, the amounts of movement/rotation of the joints derived in (STEP2-3-2) are set as fixed values, and calculation is made for a closed-loop link including all of the remaining joints (a closed polygon formed by the first open-loop link—the workpiece W—the second open-loop link) to derive the amounts of movement/rotation of all of the remaining joints.

By performing the above-described process, the amounts of movement/rotation of all of the driving joints 11c, 11d, and 11e and the follower joints 12f, 12g, 12h, and 12i can also be found in the link mechanism of the second embodiment illustrated in FIG. 8.

In summary, the use of the inverse kinematic solution for the multi-joint link mechanism 10 according to the present invention eliminates the time to test the change of the driving axes until the object distal position and pose of the device including the multi-joint link mechanism 10, which has the links restrained by the follower joints besides the driving joints, become the predetermined position and pose as in the related art. This can shorten the teaching time and accurately designate the position and pose. Further, for the joints that are not included in the loop link mechanism, derivation can be performed by considering the structure of the minimum link mechanism, and approach to the axes other than the loop link mechanism can be made as the derivation method for the multi-joint link mechanism 10 in the related art.

It should be considered that the embodiments disclosed herein are merely examples in all respects, but are not restrictive. The scope of the present invention is defined not by the above description but by the scope of the claims, and it is intended to include all modifications within the scope of the claims and the equivalents thereof.

The present application is based on Japanese Patent Application (No. 2013-112973) filed on May 29, 2013, the entire contents of which are incorporated herein by reference.

REFERENCE SIGNS LIST

1: robot system
2: welding robot
3: positioner
4: control device
5: off-line teaching-data creating device
6: welding torch
7: teaching pendant
8: workpiece mounting base
10: multi-joint link mechanism
11a, 11b, 11c, 11d, 11e: driving joint
12c, 12d, 12e, 12f, 12g, 12h, 12i: follower joint
13, 23: first link
14, 24: second link
15, 25: third link
16, 26: fourth link
17, 27: fifth link
28: sixth link
W: workpiece
F: fixed side

The invention claimed is:

1. An inverse kinematic solution for a multi-joint link mechanism, which determines, in a robot system including an articulated robot and a multi-joint link mechanism provided as a peripheral device of the robot, amounts of movement/rotation of joints in the multi-joint link mechanism to move an object disposed in the multi-joint link mechanism to a desired position and pose, wherein the multi-joint link mechanism includes a driving joint driven by a driving source and a follower joint driven by movement of the driving joint, and amounts of movement/rotation of the driving joint and the follower joint are determined by performing the steps (i) to (iii) of:

(i) selecting, from the multi-joint link mechanism, an open-loop link mechanism formed by a minimum link structure for changing a position and pose of the object, said open-loop link mechanism includes at least one link member connected to the driving joint, and a distal end of the open-loop link mechanism is a free end;

(ii) deriving amounts of movement/rotation of joints that constitute the open-loop link mechanism selected in the step (i) from the desired position and pose of the object placed in the multi-joint link mechanism; and (iii) setting the amounts of movement/rotation of the joints in the open-loop link mechanism derived in the step (ii) as fixed values to derive amounts of movement/rotation of joints in a closed-loop link mechanism constituted by at least one of the joints in the open-loop link mechanism and a non-selected joint, said closed-loop link mechanism forming a polygon.

2. The inverse kinematic solution for the multi-joint link mechanism according to claim 1, wherein a link mechanism constituted by a link and a joint that start from the object and reach a fixed side of the link mechanism by a shortest distance is adopted as the open-loop link mechanism.

3. The inverse kinematic solution for the multi-joint link mechanism according to claim 1, wherein the multi-joint link mechanism is a positioner on which the object is placed and which changes the position and pose of the object.

4. A teaching-data creating device that determines, in a robot system including an articulated robot and a multi-joint link mechanism provided as a peripheral device of the robot, teaching data on the robot and the multi-joint link mechanism, wherein the teaching-data creating device is configured to execute the inverse kinematic solution for the multi-joint link mechanism according to claim 1.

5. The inverse kinematic solution for the multi-joint link mechanism according to claim 2, wherein the multi-joint link mechanism is a positioner on which the object is placed and which changes the position and pose of the object.

* * * * *